Dec. 31, 1957  R. J. DIXON ET AL  2,818,490
MEANS FOR USE IN THE WORKING OF METALS BY ELECTRO-EROSION
Filed Aug. 10, 1953  2 Sheets-Sheet 1
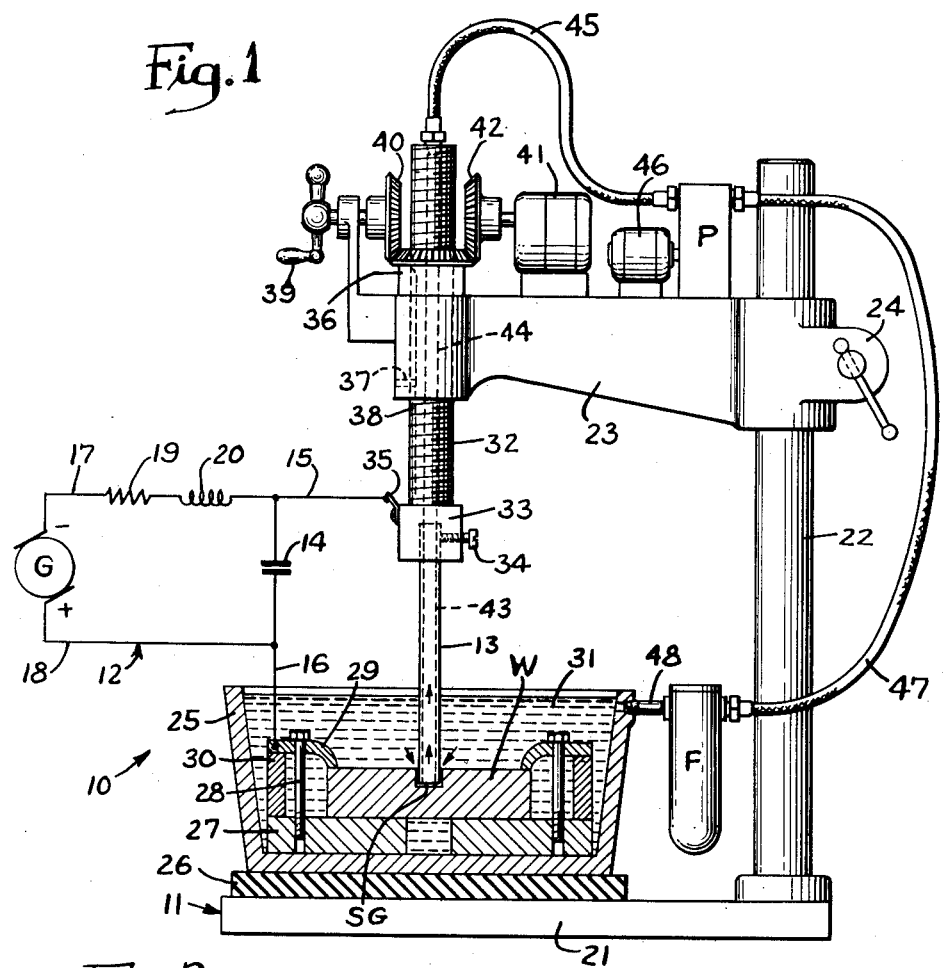
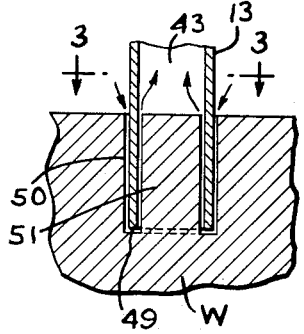
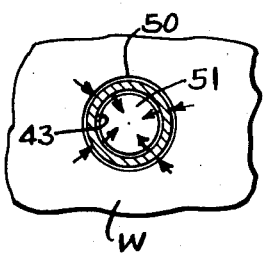
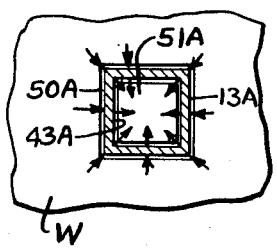
INVENTORS
REGINALD JOHN DIXON
WILLIAM HENRY BATEMAN
by: Carlson, Pitzner, Hubbard & Wolfe
Attys.

Dec. 31, 1957  R. J. DIXON ET AL  2,818,490
MEANS FOR USE IN THE WORKING OF METALS BY ELECTRO-EROSION
Filed Aug. 10, 1953  2 Sheets-Sheet 2
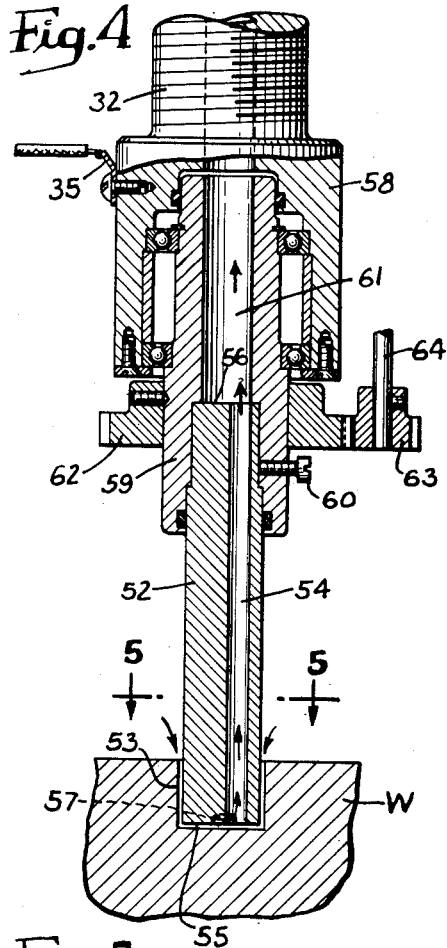
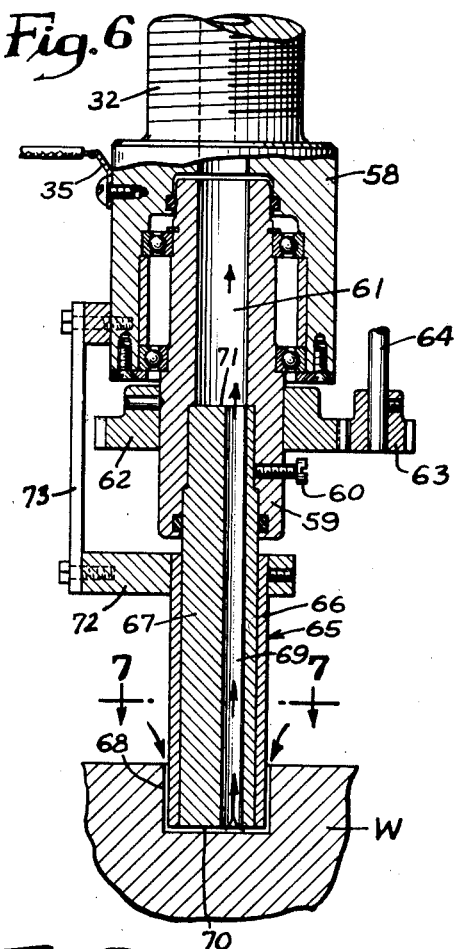
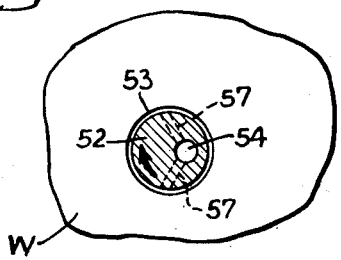
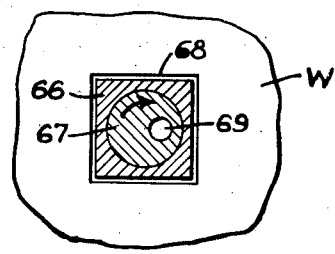
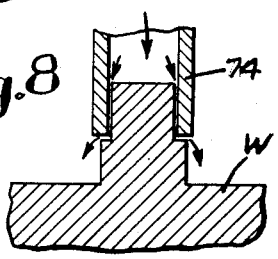
INVENTORS
REGINALD JOHN DIXON
WILLIAM HENRY BATEMAN
Carlson, Pitzner, Hubbard & Wolf
Attys

United States Patent Office 2,818,490
Patented Dec. 31, 1957

2,818,490

MEANS FOR USE IN THE WORKING OF METALS BY ELECTRO-EROSION

Reginald J. Dixon, Solihull, and William H. Bateman, Overstream, Loudwater, Rickmansworth, England, assignors, by mesne assignments, to Firth Sterling Inc., Pittsburgh, Pa., a corporation of Pennsylvania Application August 10, 1953, Serial No. 373,308

Claims priority, application Great Britain August 8, 1952

2 Claims. (Cl. 219—69)

The present invention relates in general to the field of machining electrically conductive materials by electrical dislodgment of particles therefrom, sometimes known as electro-erosion. The invention is concerned more specifically with a novel method, apparatus, and article of manufacture, all finding particular utility in this field.

Working of metals or other electrically conductive workpieces by electro-erosion may be accomplished by the application of a series of time-spaced, electric spark discharges across a spark gap between an electrode, which serves as a tool, and a workpiece, the gap being inundated with a fluid having dielectric properties. During application of such spark discharges, minute particles of the workpiece become dislodged therefrom in the region opposite the active end of the electrode, this action generating a machined contour in the workpiece. As such machining action progresses, relative feeding movement is effected between the electrode and the workpiece so as to maintain a gap of predetermined length between them. A representative method and apparatus for working sintered carbides and other hard, conductive materials by means of electro-erosion are disclosed in United States Patent No. 2,650,979, dated September 1, 1953, by Edmund E. Teubner.

One object of the present invention is to provide a novel method of machining metallic or other electrically conductive workpieces by the application thereto of a series of time-spaced electric spark discharges, such method being eminently suited for controlling the surface finish and dimensions of the workpiece with nicety and precision.

Another object of the invention is to provide a novel apparatus for machining by electro-erosion in accordance with the method disclosed herein, such apparatus being capable of producing workpieces having excellent surface finish and high dimensional accuracy.

A further object of the invention is to provide an electrode or tool construction finding particular utility in the practice of a method and in the operation of an apparatus of the character just set forth.

Other objects and advantages will become apparent as the following detailed description proceeds, taken together with the accompanying drawings, wherein:

Figure 1 is a view, partly in section and partly in elevation, showing an illustrative electro-erosion apparatus embodying the present invention and by the use of which the novel method disclosed herein may be carried out, certain portions of such apparatus being represented diagrammatically.

Fig. 2 is an enlarged, fragmentary, vertical sectional view of the electrode and workpiece of Fig. 1, such view detailing the active end portion of the electrode and the portion of the workpiece adjacent thereto.

Fig. 3 is a horizontal sectional view taken through the electrode of Fig. 2 and in the plane of line 3—3.

Fig. 3A is a view similar to Fig. 3 but showing a slightly modified form of electrode.

Fig. 4 is an enlarged, fragmentary, vertical sectional view through a modified electrode or tool representing another aspect of the present invention, such view also including a portion of an exemplary tool holder.

Fig. 5 is a horizontal sectional view taken through the electrode of Fig. 4 and in the plane of the line 5—5.

Fig. 6 is an enlarged, fragmentary, vertical sectional view through another modified electrode or tool representing still another aspect of the present invention, such view also including a portion of an exemplary tool holder.

Fig. 7 is a horizontal sectional view through the tool of Fig. 6 and taken in the plane of the line 7—7.

Fig. 8 is a fragmentary, vertical sectional view through an electrode somewhat similar to that shown in Figs. 1 and 2 but adapted to operate on the exterior of a workpiece of cylindrical or polygonal form.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

As an incident to machining by electro-erosion, the minute particles of material dislodged from the workpiece tend to accumulate in the spark gap between the active portion of the tool or electrode and the opposite region of the workpiece. These accumulated particles are normally flushed away by circulating the dielectric fluid through the spark gap. For this purpose, a hollow electrode has been utilized in conjunction with a pump and appropriate circulating conduits. In the normal course of events, dielectric fluid under pressure is discharged from the pump, passes into the hollow electrode, flows out through the spark gap and the clearance space between the electrode and the workpiece, thence passing into the reservoir of dielectric fluid surrounding the workpiece. The pump intake may be connected to this reservoir.

We have observed that when it is required to produce an accurately dimensioned workpiece or a fine surface finish by electro-erosion methods and apparatus of the type known heretofore, an undesirable effect arises from the accumulation of solid particles of workpiece material in the dielectric fluid. As such fluid is flushed from the spark gap and through the space between the finished surfaces of the workpiece and the adjacent surfaces of the tool or electrode, there is a tendency for further material removal to occur on such finished surfaces, due perhaps to partial short-circuiting of the spark gap by the particles in the dielectric fluid. This results in various aberrations in the finished surfaces of the workpiece. In the case of a simple drilling operation, for example, this phenomenon tends to produce a bell-mouthed hole in the workpiece rather than a hole of uniform diameter.

In accordance with one aspect of the present invention, there has been devised a novel method for use in machining a workpiece of metal or other conductive material by electro-erosion, and which method overcomes the difficulties just discussed. Upon superficial consideration, this method may appear to be only a minor departure from electro-erosion or spark machining methods already known. Upon further analysis, however, it will be perceived that the use of this method produces an unobvious result far overshadowing what might normally be expected from such a seemingly minor departure. More specifically, the novel method is characterized by flowing dielectric fluid through the spark gap between the electrode and the workpiece in such a manner that only clean dielectric fluid passes through the space between the finished surfaces of the workpiece and the portions of the tool situated opposite such finished surfaces. The expression "clean dielectric fluid" of course means dielectric fluid which is substantially free from workpiece particles.

In drilling, cutting, or contouring operations, where the electrode or tool is fed into the workpiece, the foregoing is accomplished by utilizing a hollow electrode having a longitudinal passage therein and by flowing clean dielectric fluid between the finished surfaces of the workpiece and the exterior surfaces of the electrode opposite the same, flowing such fluid through the spark gap between the active end of the electrode and the portion of the workpiece opposite the same where it picks up dislodged particles of the workpiece, and thence conveying the particle laden fluid away via the longitudinal passage in the hollow electrode. In the event that it is desired to re-circulate the dilelectric fluid, the practice of the present method would involve passing such fluid through an appropriate filtering means. Such filtering means may, for example, be of the permeable, mechanical, electrophoretic, or any other convenient type consistent with the user's requirements.

Referring more specifically to Fig. 1, there is shown an illustrative electro-erosion or spark machining apparatus 10 embodying the present invention and providing a convenient means for carrying out the novel method disclosed above. The apparatus 10 comprises a mechanical unit 11 and an electric circuit 12, the latter being adapted to supply a series of unidirectional, time-spaced, electric spark discharges for application to the unit 11. The unit 11 carries a workpiece W and an electrode or tool 13 mounted for movement relative to each other and separated by a spark gap inundated with a dielectric fluid.

A great variety of electrical circuits may be utilized for supplying electrical energy to the mechanical unit 11. The present invention is not concerned with the details of such circuits. Suffice it to say that in this instance, the circuit 12 comprises a direct current source in the form of a generator G and an energy storage device in the form of a condenser 14. The latter is connected across the spark gap SG between the tool 13 and the workpiece W via conductors 15, 16. The condenser 14 is charged from the generator G via conductors 17, 18 and the charging circuit includes a resistor 19 and an inductance 20. With this arrangement, the condenser 14 is repetitively charged from the generator G and discharged across the spark gap in accordance with a cycle established by the parameters of the circuit 12. The polarity of the condenser terminals is such that the positive terminal is connected to the workpiece W and its negative terminal is connected to the electrode or tool 13.

The mechanical unit 11 in this case comprises a base 21, an upright column 22, and a radial arm 23. The latter, which may be adjusted vertically and horizontally by means of a clamp 24, has an electrode holding and feeding mechanism mounted thereon. The base 21 carries a relatively large container or reservoir 25 for dielectric fluid, the container 25 being insulated from the base 21 as by means of a pad 26 of electrical insulating material. The container 25 holds a mounting block 27 to which the workpiece W is secured as by means of clamping screws 28, dogs 29 and spacers 30. All of these members, including the lower or active end of the tool 13, are inundated in a pool of dielectric fluid 31, such as kerosene or transformer oil, situated within the container 25.

The tool holding and feeding mechanism of the apparatus 11 may conveniently comprise a vertically disposed threaded spindle 32 carried by the radial arm 23 and susceptible of vertical sliding movement relative thereto. At its lower end, the spindle 32 terminates in a chuck 33 which holds the electrode or tool 13. The shank end of the latter fits into an appropriate axial recess in the chuck 33 and may be retained therein by means such as a set screw 34. The chuck 33 may also have secured thereon terminal lug 35 of the electrical conductor 15.

Feeding of the spindle 32 and the electrode or tool 13 may be effected either manually or automatically by the application of an appropriate torque to an internally threaded bevel pinion 36 which abuts against the top of the arm 23. Rotation of the pinion 36 in one direction serves to raise the spindle 32 and the tool 13 while rotation of the pinion 36 in the opposite direction serves to lower the spindle and the tool. During the course of such movement, the spindle 32 is constrained against rotation by the use of a pin 37 which engages a keyway 38 running longitudinally of the spindle.

Manual feeding of the spindle 32 may be accomplished by means of a hand crank 39 which drives a pinion 40 meshing with the teeth of the pinion 36. Automatic feeding of the spindle 32 may be effected by means of a motor and reduction gear unit 41 which drives a pinion 42 meshing with the teeth of the pinion 36. The unit 41 may be automatically controlled in any suitable manner so as to maintain the spark gap SG at a predetermined dimension as particles become dislodged from the workpiece.

Provision is made in the apparatus 10 for circulating dielectric fluid through the active portion of the spark gap to remove dislodged workpiece particles, while insuring that only dielectric fluid which is substantially free from such particles passes through the space between the finished surfaces of the workpiece and the surfaces of the electrode situated in proximity thereto. In furtherance of such objective, the electrode or tool 13 is formed with a longitudinal passage 43 open at both the active and the shank end of the electrode. Communicating with the passage 43 is a longitudinal bore 44 in the spindle 32. The bore 44 is connected directly with the suction side of a pump P by means such as a flexible conduit 45 of insulating material. The pump P, which happens to be mounted on the arm 23 and driven by a motor 46, has its discharge side connected to feed dielectric fluid into the container or reservoir 25. The discharge line connections in this case include another flexible conduit of insulating material 47, a filter unit F of any appropriate type, and a short conduit 48 between the filter unit F and the container 25.

In operation of the apparatus 10, the electrode or tool 13 is fed toward the workpiece W so as to maintain the spark gap SG at a predetermined dimension. The dielectric fluid in the gap breaks down repetitively as time-spaced electric spark discharges occur between the active or lower end 49 of the electrode 13 and an opposed annular area on the workpiece W. Particles of the workpiece become dislodged over this area and such action continues as the electrode is progressively fed into the workpiece. This action produces a cut analogous to that made by a trepanning operation, leaving in the workpiece a hole or bore 50 with a central plug 51 which drops free as the electrode 13 passes through the workpiece. During all this time, clean dielectric fluid is caused to flow into the space between the finished surface of the hole 50 and the corresponding portion of the exterior surface of the electrode situated in proximity thereto, as indicated by the arrows in Figs. 2 and 3. The dielectric fluid then flows through the active portion of the spark gap between the active end 49 of the electrode 13 and the opposed area of the workpiece which is then being subjected to cutting action. In this region, the dielectric fluid picks up the dislodged workpiece particles and is discharged through the longitudinal passage 43 in the interior of the electrode. By reason of such arrangement, further material removal due to the flow of particle laden dielectric fluid between the workpiece and the electrode is confined to the surface of the plug 51. Since the plug normally becomes scrap, aberrations in its surface are immaterial.

The apparatus 10 is usable with electrodes or tools having a variety of cross sectional shapes. For example, in Fig. 3A there is shown a modified electrode 13A similar to the electrode 13 but having a cross section in the form of a hollow square. As will be readily appreciated, the tool 13A defines in the workpiece W a square hole 50A as well as square plug 51A. As indicated by the arrows, dielectric fluid is circulated through the hole 50A and longitudinal passage 43A of the electrode 13A after the manner already described in connectcion with the electrode 13.

Turning now to Figs. 4 to 7, inclusive, it will be perceived that the present invention is also applicable to the production of blind holes in a workpiece. Such holes may be of any given cross sectional form, including circular, square, or polygonal shapes.

Referring more specifically to Figs. 4 and 5, there is shown a modified electrode or tool 52 adapted to produce in the workpiece a blind hole 53 of circular cross section (Fig. 5). The electrode 52 has a longitudinal passage 54 for dielectric fluid, such passage being open at both the active end 55 and the shank end 56 of the electrode. As in the case of the electrode 13, the electrode 52 may be mounted and fed progressively into the workpiece W by electro-erosion means such as the apparatus 10.

In order to preclude formation of a central plug in the hole 53, provision is made for rotating the electrode 52 about its longitudinal axis and the dielectric fluid passage 54 is situated eccentrically of such axis. The eccentricity of the passage 54 is such that no one area on the floor of the hole 53 underlies the passage 54 without interruption due to rotation of the electrode. While the passage 54 need not be situated eccentrically of the rotational axis of the electrode 52 for the entire length of the latter, at least a portion of the passage 54 terminating at the active end 55 of the electrode 52 must be situated entirely on one side of the axis of rotation. The speed of rotation of the electrode 52 may be any selected value consistent with the results to be achieved and may be completely independent of the speed at which the electrode 52 is fed into the workpiece.

During operation of the electrode 52, clean dielectric fluid flows between the finished surfaces of the hole 53 and the exterior surfaces of the electrode 52 in proximity thereto. Such fluid then passes between the active end 55 of the electrode and the bottom of the hole 53, picking up dislodged workpiece particles and being discharged through the passage 54 of the electrode. One or more transverse grooves 57 may be formed in the active end of the electrode 55 to facilitate entry of dielectric fluid into the passage 54 (Fig. 5).

The tool or electrode 52 may be mounted, rotated, and fed into the workpiece in various ways. For example, resort may be had to a modified chuck 58 fixed to the spindle 32. The chuck 58 has a toolholder 59 journaled therein. The latter happens to be fashioned as a hollow sleeve recessed at its lower end to receive the shank end of the electrode 52 which is retained in place by means of set screw 60. Communication between the fluid passage 54 of the electrode and fluid passage 44 of the spindle is accomplished through a central bore 61 in the toolholder. Rotation of the toolholder 59, and hence rotation of the electrode 52, may readily be accomplished by means of a gear 62 fixed to the toolholder and a drive pinion 63 meshing with the gear 62. The pinion 63 may, in turn, be driven from any suitable prime mover (not shown) as by means of shaft 64.

Referring next to Figs 6 and 7, there is shown an electrode construction which may be utilized to produce blind holes having cross sectional shapes other than circular. The cross sectional shape of the hole shown in these figures happens to be square, but this is merely for purposes of illustration as splined or other shaped holes could be produced with equal facility. In the present instance, the blind hole of square cross section is produced by the use of a composite electrode 65. The latter comprises a non-rotary outer member 66 and a rotary inner member 67. The non-rotary outer member 66 has a cross section in the form of a hollow square and defines a corresponding square shape in the hole 68 made by the electrode in the workpiece W. The rotary inner member 67 is generally similar to the electrode 52 described earlier herein. The inner member 67 has an eccentrically mounted longitudinal passage 69 situated on one side of the rotational axis of the member 67. The passage 69 extends between the active end 70 and the shank end 71 of the electrode.

The electrode 65 may be mounted and fed in a manner similar to that utilized for the electrode 52. As shown in Fig. 6, the rotary inner member 67 is mounted in a toolholder 59 carried by chuck 58 and spindle 32, all similar to corresponding parts described above. The outer member 66 has its shank end mounted in a collar 72 which is rigidly fixed to the chuck 58 by means of one or more brackets 73. By proportioning of the parts, or by proper adjustment, or both, the member 66 when clamped in the collar 72 has its lower end flush with the lower end of the rotary member 67. By reason of such arrangement, the two components 66 and 67 of the electrode 65 may be fed in unison into the workpiece W. At the same time, the inner member 67 may be subjected to constant rotation by the toolholder 59.

As the electrode 65 operates on the workpiece, clean dielectric fluid is permitted to flow between the finished surfaces of the hole 68 and the exterior surfaces of the electrode in proximity thereto. Actually, these exterior electrode surfaces are on the non-rotary member 66. The clean fluid then passes through the active portion of the spark gap between the active end 70 of the electrode and the bottom of the hole 68, accumulating dislodged workpiece particles and ultimately being discharged via the eccentric passage 69 of the rotary member 67. At the shank end of the tool, this passage communicates with the spindle bore 44 via the passage 61 of the toolholder 59.

In Fig. 8, there is shown a hollow electrode 74 generally similar to the electrode 13 illustrated in Figs. 1, 2 and 3. In this case, however, the workpiece W has a circular or polygonal projection which is being machined by telescoping the electrode 74 thereover. Dielectric fluid is circulated through the spark gap in the direction indicated by the arrows.

We claim as our invention:

1. An electro-erosion apparatus for forming a blind hole of non-circular shape in a workpiece of metal or other conductive material, said apparatus comprising, in combination, means for holding the workpiece, a composite elongated electrode having an inner member and an outer member, said inner member having an open-ended longitudinal bore situated on one side of its longitudinal axis, said outer member having a shape corresponding to that of the hole to be formed in the workpiece, one end of said electrode being spaced from the workpiece by a spark gap filled with a dielectric liquid, an electric circuit for passing time-spaced spark discharges between said electrode and the workpiece through the dielectric liquid, means for circulating the dielectric liquid through the spark gap and the longitudinal bore of said inner member, means for effecting relative feeding movement between said end of said electrode and the workpiece, means for rotating said inner member about its longitudinal axis during the course of said feeding movement, and means for constraining said outer member against rotation during the course of said feeding movement.

2. A spark gap electrode tool of an electro-erosion apparatus for forming blind holes of non-circular cross section by progressive advance into a conductive workpiece, said tool comprising the combination of a non-rotatable outer member having a shape corresponding to that of the hole to be formed in the workpiece, and a rotatable hollow inner member having a telescoped relation to the outer member said inner member having an open-ended bore situated on one side of its axis of rotation.

References Cited in the file of this patent

UNITED STATES PATENTS

| | | |
|---|---|---|
| 1,651,074 | Steffens | Nov. 29, 1927 |
| 2,308,860 | Clark | Jan. 19, 1943 |
| 2,385,665 | Warwick | Sept. 25, 1945 |
| 2,427,588 | Burnett | Sept. 16, 1947 |

FOREIGN PATENTS

| | | |
|---|---|---|
| 637,793 | Great Britain | May 24, 1950 |

OTHER REFERENCES

Arc Machining by Harding and Matulaitis in American Machinist of March 3, 1952, pp. 136–141.